(12) United States Patent
Wallace

(10) Patent No.: US 12,435,230 B2
(45) Date of Patent: Oct. 7, 2025

(54) DE-INKABLE INKS WITH HIGH BIO-RENEWABLE CONTENT

(71) Applicant: SUN CHEMICAL B.V., LV Weesp (NL)

(72) Inventor: Paul Wallace, South Normanton (GB)

(73) Assignee: SUN CHEMICAL B.V., Weesp (NL)

( * ) Notice: Subject to any disclaimer, the term of this patent is extended or adjusted under 35 U.S.C. 154(b) by 0 days.

(21) Appl. No.: 18/995,435

(22) PCT Filed: Nov. 14, 2023

(86) PCT No.: PCT/GB2023/052974
§ 371 (c)(1),
(2) Date: Jan. 16, 2025

(87) PCT Pub. No.: WO2024/105376
PCT Pub. Date: May 23, 2024

(65) Prior Publication Data
US 2025/0257230 A1    Aug. 14, 2025

(30) Foreign Application Priority Data
Nov. 14, 2022  (GB) ..................... 2216946

(51) Int. Cl.
| | | |
|---|---|---|
| C09D 11/322 | (2014.01) |
| C08K 5/00 | (2006.01) |
| C08K 5/053 | (2006.01) |
| C08K 5/09 | (2006.01) |
| C09D 9/00 | (2006.01) |
| C09D 11/38 | (2014.01) |
| D21C 5/02 | (2006.01) |

(52) U.S. Cl.
CPC .......... *C09D 11/322* (2013.01); *C08K 5/0041* (2013.01); *C08K 5/0058* (2013.01); *C08K 5/053* (2013.01); *C08K 5/09* (2013.01); *C09D 9/00* (2013.01); *C09D 11/38* (2013.01); *D21C 5/027* (2013.01); *C08K 2201/005* (2013.01)

(58) Field of Classification Search
CPC ..... C09D 11/322; C09D 11/324; C09D 11/30; C09D 11/037; C09D 11/04; Y10T 428/24802; A61K 2800/43; A61Q 1/02; B41J 2/2107; D06P 1/44; C09B 67/0002; C01P 2004/62
See application file for complete search history.

(56) References Cited

U.S. PATENT DOCUMENTS 5,328,683 A * 7/1994 Harashima ........... A61K 8/0241
424/401
2022/0396701 A1 * 12/2022 Dipietro .................. C09B 69/02

FOREIGN PATENT DOCUMENTS

| EP | 0933411 A1 | 8/1999 |
| EP | 3341209 A1 | 7/2018 |
| WO | WO2020/026161 A1 | 2/2020 |

OTHER PUBLICATIONS

International Search Report issued in International Application No. PCT/GB2023/052974, mailed Feb. 16, 2024.
Written Opinion of the International Searching Authority issued in International Application No. PCT/GB2023/052974, mailed Feb. 16, 2024.
International Preliminary Report on Patentability (Chapter II of the Patent Cooperation Treaty) issued in International Application No. PCT/GB2023/052974, mailed Oct. 25, 2024.
M Abou Taleb et al: "A novel approach in pigment printing using nano-keratin based binder", Indian Journal of Fibre & Textile Research, vol. 43, Mar. 1, 2018 (Mar. 1, 2018), pp. 83-91, XP055684298, the whole document.

* cited by examiner

*Primary Examiner* — John Zimmermann
(74) *Attorney, Agent, or Firm* — Marian E. Fundytus; Amster Rothstein & Ebenstein LLP

(57) ABSTRACT

The present invention relates to a printing ink composition comprising one or more keratin-based pigment(s) and water, wherein the one or more keratin-based pigment(s) has an average particle size of no more than 3000 nm.

23 Claims, No Drawings

DE-INKABLE INKS WITH HIGH BIO-RENEWABLE CONTENT

CROSS REFERENCE TO RELATED APPLICATIONS

The present application is a § 371 National Phase application based on PCT/GB2023/052974 filed Nov. 14, 2023, which claims the benefit of GB Application No. GB2216946.0, filed Nov. 14, 2022, the subject matter of each of which is incorporated by reference in their entirety.

The present application relates to printing ink compositions comprising one or more keratin-based pigment(s) and water. Advantageously, the inks according to the invention have superior colour and lightfastness properties compared to traditional dye-based inks. Moreover, substrates that have been printed with the ink according to the invention can typically be de-inked using mild alkaline pH water solutions thereby enabling the substrate to be more easily recycled and reused. Thus, the printing ink compositions according to the invention can improve sustainability in, for example, packaging and textile industries.

Dyeing and printing of substrates (e.g., textiles, papers and plastics) with dye-based inks creates printed substrates which have the dyes either covalently attached to the fibres (reactive, direct dyes), e.g., cellulosic fibres in the case of cellulosic-based substrates, or alternatively strongly ionically bound (acid dyes) in the case of, for example, silk, synthetic Nylon and other substrates.

With the increased market focus on sustainability and recycling, de-inking of such substrates has become more important in providing fully recyclable textiles, paper and plastics. Typically, extremely harsh chemical treatments are required to remove dyes from textiles, papers and plastics, including steps such as bleaching and oxidation. Furthermore, the wastewater can be heavily contaminated with environmentally hazardous chemicals.

The present invention solves these problems by providing printing ink compositions comprising a keratin-based pigment and water, which provide easy de-inking under simple aqueous alkaline conditions. Advantageously, the printing ink compositions according to the present invention are suitable for inkjet printing.

EP 3,341,209 (Plastipak Packaging) relates to ink compositions for digital printing comprising an ink removal-promoting additive, specifically an ink removal-promoting additive with Tg<130° C. at a level of 5-20% w/w. Exemplary ink removal-promoting additives include styrene maleic-anhydride (SMAN) binders with acid numbers of 150-205 mg KOH/g. EP 3,341,209 specifically relates to printing onto a plastic recyclable article and the use of a removal fluid having a pH of 12-13 at 70-90° C.

WO 2020/026161 A1 (Wool Source) mentions the application of keratin-derived pigments. The keratin-derived pigments described in WO 2020/026161 are not milled prior to use. WO 2020/026161 does not disclose use of keratin-derived pigments for inkjet printing of substrates (e.g., textiles, papers and plastics).

Citation or identification of any document in this application is not an admission that such represents prior art to the present invention.

DESCRIPTION

In a first aspect, the present invention provides a printing ink composition comprising one or more keratin-based pigment(s) and water, wherein the one or more keratin-based pigment(s) has an average particle size of no more than 3000 nm. Preferably, the one or more keratin-based pigment(s) has an average particle size of no more than 2000 nm, preferably no more than 1000 nm, more preferably no more than 600 nm.

Preferably, the one or more keratin-based pigment(s) has an average particle size of from 50 to 3000 nm, preferably from 75 to 2000 nm, more preferably from 100 to 1000 nm, even more preferably from 125 to 600 nm.

Unless stated otherwise, the terms "particle size" or "average particle size" used herein refer to the volume distributed median particle diameter (equivalent spherical diameter corresponding to 50% of the volume of all the particles, read on the cumulative distribution curve relating volume % to the diameter of the particles-often referred to as the "D (v,0.5)" value or Dv50). Unless stated otherwise, particle size is suitably measured by dynamic light scattering (DLS). Preferably, particle size is suitably measured by dynamic light scattering (DLS) using a Malvern Zetasizer. Unless stated otherwise, particle size is suitably measured by DLS in deionized water at 20° C.

In the context of the invention "nanoscale" refers to a particle having one dimension of less than 100 nm, a commonly accepted definition of a nanoparticle.

As will be understood by the skilled person, keratin-based pigments are obtained by dyeing keratin particles. Typically, the keratin particles suitable for use in the present invention are prepared from keratin fibres derived from animal sources including animal hair, wool or fur (such as from sheep, goat, alpaca, cow, pig and the like); animal horns, nails, claws and hooves (such as from cattle, goats, antelope); and animal feathers and scales (such as from birds and fish). Preferably, the keratin particles are derived from sheep wool. The keratin particles are dyed using a material suitable for dyeing animal fibres. For example, dyes suitable for wool dyeing such as acid dyes including Sandolan, Lanasyn, and the Lanasan range. These dyes can be used under typical industrial dyeing conditions to produce dyed keratin particles of a range of colours and shades. WO 2020/026161 discloses a method for preparing keratin particles and dyeing keratin particles. WO 2020/026161 does not disclose milling of the dyed keratin particles prior to use.

Preferably, the keratin-based pigments are dyed keratin particles. Preferably, the keratin-based pigments are acid dyed keratin particles (i.e., the keratin particles have been dyed with an acid dye).

Typically, the keratin-based pigments according to the invention can be considered as lake pigments. As will be understood by the skilled person, a lake pigment is made by precipitating a water-soluble dye with an inert binder, in this case a keratin particle. As will be further understood by the skilled person, inks comprising lake pigments typically have superior lightfastness compared to traditional dye-based inks.

The present invention also provides a method of preparing a printing ink composition comprising one or more keratin-based pigment(s) and water, said method comprising milling a dispersion comprising water and one or more keratin-based pigment(s).

The keratin-based pigments present in the composition of the invention are milled to obtain the requisite particle size. Milling can be performed using a suitable bead milling machine such as an Eiger laboratory bead mill (from Eiger Torrance Ltd.) equipped with a suitable grinding media. Suitable grinding media include 0.8 mm Ytterbium-Zirconium Oxide grinding media. Preferably, milling is performed for up to 60 minutes, more preferably for up to 45 minutes, more preferably for up to 30 minutes, more preferably for up to 20 minutes. As used herein, "up to" includes the endpoint such that "up to" 60 minutes (for example) includes 60 minutes.

Preferably, milling is performed for 1 to 60 minutes, more preferably for 5 to 45 minutes, even more preferably 8 to 30 minutes, most preferably 10 to 20 minutes.

Preferably, milling is performed for 45 minutes, more preferably for 30 minutes, even more preferably for 20 minutes.

Preferably, milling is performed to reduce the average particle of the keratin-based pigments to no more than 3000 nm, preferably no more than 2000 nm, more preferably no more than 1000 nm, even more preferably no more than 600 nm. Preferably, milled in performed to reduce the average particle of the keratin-based pigments to from 50 to 3000 nm, preferably from 75 to 2000 nm, more preferably from 100 to 1000 nm, even more preferably from 125 to 600 nm.

The printing ink compositions according to the present invention comprising keratin-based pigments having the requisite particle size are found to be more lightfast and colourfast compared to corresponding inks comprising conventional dyes. In addition, the printing ink compositions according to the present invention comprising keratin-based pigments having the requisite particle size have increased colour strength compared to compositions comprising larger keratin-based pigments. Preferably, the keratin-based pigments comprise alpha-keratin ($\alpha$-keratin). As will be understood by the skilled person, alpha-keratin is a polypeptide chain that forms an alpha-helix ($\alpha$-helix). Two of these alpha-helices typically twist together to form a helical structure (often referred to as a coiled coil). Without wishing to be bound in this regard, the inventor hypothesises that milling the keratin-based pigments to achieve the requisite particle size results in a partial unravelling of the keratin helical structure. In particular, it is hypothesised that milling may break down the disulfide and other bridging bonds in the keratin structure such that the keratin is more open resulting in increased colour strength. In addition, the small particle size obtained by milling the keratin-based pigments (i.e., no more than 3000 nm) means that the resulting ink composition is suitable for inkjet printing.

Preferably, the keratin-based pigments used in the present invention are milled prior to use. Preferably, the milled keratin-based pigments comprise keratin-based pigments wherein the helical structure of the keratin is partially unraveled. Preferably, the milled keratin-based pigments comprise alpha-keratin wherein the helical structure of the alpha-keratin is partially unraveled. Unless stated otherwise, a partially unraveled helical structure means that a portion of bridging bonds in the keratin helical structure have been broken down. For example, without wishing to be bound in this regard, the inventor hypothesises that, upon milling at least 5% of the bridging bonds in the keratin helical structure have been broken down. The partially unraveled helical structure can be observed by electron microscopy, for example scanning electron microscopy.

Preferably, the printing ink compositions of the invention have a viscosity of 4-15 cP as measured at 32° C. using a Brookfield DVII+Pro viscometer fitted with a 00 spindle. More preferably, the printing ink compositions of the invention have a viscosity of 4-15 cP as measured at 32° C. at 60 rpm using a Brookfield DVII+Pro viscometer fitted with a 00 spindle.

Furthermore, inks according to the present invention are more easily cleaved from the surface of substrates (particularly textiles and papers) than conventional dyes without the need for harsh chemical treatments for example using strong oxidizing or bleaching agents such as sodium hypochlorite or hydrogen peroxide. Hence, the inks according to the present invention are advantageous as they improve the recyclability of printed substrates.

When trying to remove reactive dyes, which are bound covalently to textiles such as cotton, or acid dyes, which are strongly ionically bound to textiles such as polyamide, harsh chemical and often microbial treatments, often in combination with bleaching agents, need to be employed. Even with these harsh oxidative or bleaching techniques, it is nearly impossible to remove sufficient traces of the dyes from the textiles or other substrates. In the present invention, the inventors tackle the problem of de-inking by use of a printing ink, containing small particles of keratin-based pigment particles (i.e., keratin-based pigment particles having an average particle size of no more than 3000 nm) deposited by means of inkjet printing and capable of being de-inked by simple mild alkaline pH water solutions (e.g., water solutions having a pH of 10-11 at around 25-65° C.).

Preferably, the printing inks according to the present invention are water-based. Unless stated otherwise, water-based inks comprise at least 20% by weight water, at least 25% by weight water, at least 30% by weight water, at least 40% by weight water, or at least 50% by weight water. The amount of water is at most 95% by weight, at most 90% by weight, at most 85% by weight, at most 80% by weight, at most 75% by weight, or at most 70% by weight. The range of water in the composition is typically from about 30 to about 90% by weight, and more typically from about 40 to about 80% by weight, or even more typically from about 50 to about 70% by weight.

The printing inks according to the present invention may optionally comprise one or more humectants in addition to water, i.e., the carrier liquid for the ink is water and a humectant. The humectant is preferably derived from a renewal source. Examples of suitable humectants include polyols such as glycerol, ethylene glycol, diethylene glycol, monopropylene glycol and combinations thereof. Preferably, the ink composition according to the present invention comprises glycerol. A typical amount of humectant in the composition is 0.5 to 35% by weight, preferably the humectant is present in 5 to 30% by weight.

The printing inks according to the present invention may optionally further comprise one or more additional materials selected from the group consisting of humectants (solid or liquid), wetting agents, dispersants, surfactants, binders, viscosity modifiers and preservatives.

Preferably, the printing ink according to the present invention may further comprise a wetting agent or dispersant, preferably a dispersant. Suitable dispersants may include alkyl sulfonic acid salts, fatty sulfonic acid salts and alkyl aryl sulfonic acid salts. As will be understood, a fatty sulfonic acid is a sulfonic acid with an aliphatic chain, which is either saturated or unsaturated. Preferably, the dispersant is a coconut or palm-oil based dispersant such as sodium lauryl sulphate. Preferably, the dispersant is sodium lauryl sulphate. Where used, the dispersant is typically present in 0.1 to 5% by weight of the composition.

The printing inks according to the present invention may optionally further comprise a viscosity modifier. Preferably, the viscosity modifier is selected from the group consisting of Guar gum, Gum Arabic, Xanthan gum, trehalose and combinations thereof.

The printing inks according to the present invention may optionally further comprise one or more anti-microbial agents (e.g., Proxel GXL) and/or one or more defoamers (e.g., Airase 5355). Where used, the anti-microbial agent(s) is typically present in 0.05 to 3% by weight. Where used, the defoamer(s) is typically present in 0.01 to 1.5% by weight.

Preferably, the printing inks according to the present invention are applied to a suitable substrate and then heated. On heating, the inks are fixed by curing at temperatures up to 220° C., with no thermal degradation, depending on the temperature stability of the substrate. In most cases, significantly lower curing temperatures are required. Preferably, the inks are cured at 50-220° C., more preferably at 80-190° C.

The inks can be cured on a variety of plastic, textile, paper (which includes card and wallpaper), metal, glass and other substrates and exhibit excellent adhesion and rub fastness properties. It is hypothesised that the additional improved rub fastness is derived from the keratin-pigment particles which, due to their hydrophobic nature, actually rise to the surface of the coating on curing. This imparts a softer feel or "hand" to the surface of the printed substrate and furthermore improves the lightfastness as the keratin protects the dyes from UV degradation.

Preferably, the ink composition of the present invention is suitable for inkjet printing. More preferably, the ink composition of the present invention is an inkjet printing ink.

The present invention also provides a method of de-inking a substrate comprising the ink composition as defined herein printed and dried onto the substrate, wherein the method comprises immersing the printed substrate in a de-inking solution comprising alkaline water at pH 7.1-14.0.

As will be understood in the art, the term "de-ink" or "de-inking" means removal of an ink from a printed substrate.

De-inking can be readily achieved by immersing the object (i.e., printed substrate) in an alkaline solution, preferably a mildly alkaline solution, for example triethanolamine in water, which has a pH of 10-11 at around 25-65° C. The ink is removed visibly from all substrates by hydrolysis of the bonds formed during curing. Furthermore, the basic removal liquid can be recycled to recover the keratin if desired and/or the dyes. Similarly, the de-inked substrates can be recycled and re-used.

One further technical advantage of this invention is the sustainability of the inks, including the exceptionally high Bio-Renewable Carbon (BRC) content, which can be raised to over 90%. Furthermore, the inks and the ability for substrates such as textiles and papers comprising them to be de-inked after use in a facile manner permits for textiles and papers to be recycled and reused. Both bring significant advantages, especially in packaging-based and textile-based applications, where sustainable and de-inkable inks are currently not available.

EP 3,341,209 (Plastipak Packaging) mentions that a recyclable plastic article which is decorated with an ink comprising a base ink and an additional ink removal-promoting additive, can be de-inked using a basic solution with a pH 12-13 in the temperature range 70-90° C. EP 3,341,209 discloses that styrene maleic anhydride copolymer can be used as the ink removal-promoting additive, with a Tg in the range of 50-110° C. and an acid number in the range of 150 mg KOH/g to 205 mg KOH/g. Importantly, in EP 3,341,209, the loading of the ink removal-promoting material, which is exclusively styrene-maleic anhydride, is present in the ink at 5-20% (w/w).

Preferably, the inks according to the present invention comprise less than 5% (w/w) of a polymeric binder selected from styrene maleic-anhydride, styrene-maleic acid, acrylics, polyurethanes, polycarbonates and co-polymers thereof.

More preferably, the inks are substantially free of (i.e., comprise no more than 1% (w/w) of) a polymeric binder selected from styrene maleic-anhydride, styrene-maleic acid, acrylics, polyurethanes, polycarbonates and co-polymers thereof.

Preferably, the inks according to the present invention comprise less than 5% (w/w) of an acid-functional polymer binder selected from acid-functional styrene maleic-anhydride, styrene-maleic acid, acrylics, polyurethanes, polycarbonates and co-polymers thereof. More preferably, the inks are substantially free of (i.e., comprise no more than 1% (w/w) of) an acid-functional polymer binder selected from acid-functional styrene maleic-anhydride, styrene-maleic acid, acrylics, polyurethanes, polycarbonates and co-polymers thereof.

The inks of the present invention may contain low levels (i.e., less than 5% (w/w)) of carboxylic or sulfonic functional binders which are capable of chemically covalently binding with various textile fabrics and additionally the keratin-pigment particles. Accordingly, the inks according to the present invention may comprise less than 5% (w/w) of a carboxylic or sulfonic acid-functional polymer binder selected from carboxylic or sulfonic acid-functional styrene maleic-anhydride, styrene-maleic acid, acrylics, polyurethanes, polycarbonates and co-polymers thereof. More preferably, the inks are substantially free of (i.e., comprise no more than 1% (w/w) of) a carboxylic or sulfonic acid-functional polymer binder selected from carboxylic or sulfonic acid-functional styrene maleic-anhydride, styrene-maleic acid, acrylics, polyurethanes, polycarbonates and co-polymers thereof.

Alternatively, the inks can comprise an optional binder to promote superior fixation to the substrate. When an optional binder is selected for the keratin-based pigment particles these can be from a number of different classes, such as acid-functional and optionally and additionally hydroxyl-functional styrene-maleic anhydride, styrene-maleic acid co-polymers, acrylic polymers, polyurethanes, polycarbonates and various available co-polymers thereof. However, it is preferred that the optional binder (as well as any dispersant present) is derived from natural sources to maintain the high (preferably 85% or more) bio-renewable carbon (BRC) content of the ink.

Preferably, the one or more keratin-based pigment(s) is present in at least 5% (w/w), preferably at least 7% (w/w), more preferably at least 9% (w/w). Preferably, the one or more keratin-based pigment(s) is present in at most 15% (w/w) of the composition. Preferably, the ink composition according to the invention comprises from about 5% to about 15% (w/w) of one or more keratin-based pigment(s), preferably from about 7% to about 12% (w/w) of one or more keratin-based pigment(s).

When printed and fixed under normal working conditions, for example inkjet printing, followed by thermal heat press fixation at 160° C. for 2 minutes, the pigments were found to bind well to a number of different textile substrates including cotton and polyester. Indeed, even when immersed in standard washing liquids the removal of the pigment was not possible.

The use of the keratin-based pigments in the inks of the invention is advantageous as the dyes can bind to a variety of different substrates, some of which cannot normally be decorated with dye-based inks, and then the substrates can be readily de-inked. In particular, the colorant particles (from the keratin-based pigments) can be completely removed from the substrates. In this invention, the ink binder (where present) can form covalent or ionic bonds with the keratin-pigment and in some cases, can also form covalent or ionic binds with the substrate. These are then broken down during the alkaline hydrolysis and not only can the substrate be recycled, but the dyes and keratin particles can also be recycled.

The ink compositions according to the present invention can be printed onto a variety of different substrates. Examples of suitable substrates to which this invention is directed include plastic, textile, paper, metal, glass, polymeric film and ceramic substrates amongst others. Suitable polymeric film substrates include BOPP (biaxially oriented polypropylene), Cellophane (cellulose), LDPE/HDPE (low and high density polyethylenes), OPP (orientated polypropylene), MET-OPP (metalized orientated polypropylene), PA (polyamide), PET (polyethylene terephthalate), MET-PET (metalized polyethylene terephthalate), PP (polypropylene) and PVC (polyvinyl chloride). Suitable metal substrates for the present invention include steel (including protected steel) and aluminium (including protected aluminium).

The substrates of particular suitability for the present invention are preferably textile and paper substrates, more preferably a textile substrate.

Suitable paper substrates include wallpaper and cardboard. As will be understood in the art, paper is a synthetic material formed from cellulose fibres.

As will be understood in the art, textiles are formed from weaving, knitting, crocheting, knotting, tatting, felting, bonding and/or braiding yarns, which themselves are formed from fibres. The textile substrates suitable for use in the present invention may be selected from cotton, rayon, silk, polyester, PET (Polyethylene terephthalate), viscose, nylon, polyamide, canvas, chenille, chiffon, crepe, damask, georgette, gingham, jersey, lace, linen, polyvinyl chloride, leather, wool (e.g., cashmere or merino wool), modal, muslin, organza, satin, spandex, suede, taffeta, toile, tweed, twill, velvet, hemp, ramie, sisal, bamboo, flax and combinations thereof. More preferably, the substrates suitable for use in the present invention are selected from cotton, polyester and combinations thereof.

As used herein, a textile substrate does not include paper.

The inks in this invention are preferably comprised predominantly of bio-renewable carbon (BRC) content raw materials, whereby even the colorant is comprised of around 90% bio-renewable carbon. Unless stated otherwise, the BRC content is determined in accordance with ASTM D6866-18 Method B (AMS) using NIST Standard Reference Material (SRM) 4990C. In all cases, water is excepted from the BRC content. By selecting a keratin-derived pigment, which preferably has a BRC content of 90% or above, and preferably a coconut or palm-oil based dispersant, such as sodium lauryl sulfate, which has a BRC of 100%, then high BRC content dispersions can be formulated (preferably dispersions having a BRC content of 85% or more, more preferably 90% or more) which in turn, by careful selection of ink ingredients can derive high BRC content inks (preferably inks having a BRC content of 85% or more, more preferably 90% or more). Preferably, the inks according to the present invention have a BRC content of ≥90%.

The inks according to the present invention are preferably very resoluble, which is important for inkjet deposition methods. Resolubility is particularly important in inkjet printing as when the printer is not being used, it is possible for solid deposits to form in the inkjet nozzles as the ink dries in the ambient air. The ability for these solid particles to re-dissolve on start-up of the printer (or be cleaned using a simple maintenance wipe) is termed the resolubility. The inks in this invention were found to have exceptional resolubility, much higher than the inks from a comparative example with a standard textile pigment ink. The inks in this invention also impart a soft and protective hand or feel to the object which has been treated and are found to be very resistant to cracking. The cured films obtained from the inks according to the invention preferably have improved scratch and abrasion resistance compared to using normal organic pigments and furthermore, the lightfastness of the printed films containing the keratin-derived pigments is superior to those for the corresponding dyes only.

The treatment of textile fabrics with inks containing keratin-based pigments, were also found to exhibit superior fastness properties to those textile fabrics printed with the corresponding dye inks only. Furthermore, the dye-only inks could not be de-inked under the mildly basic aqueous conditions described above, but the inventive inks were readily de-inked under the same conditions.

The keratin-based pigment particles used in the inks of the invention are "sponge-like" in their nature and are very compressible, especially using the shear forces imparted on an ink when deposited using an inkjet printing head. Indeed, it was found that the inks containing such pigment particles were essentially self-cleaning and the printing nozzles remained clear of debris or deposits during print testing. Furthermore, the compressibility of the particles of keratin pigment in the inkjet printing head means that particles which are larger than the normal perceived size for an organic pigment alone, around 101-150 nm, can be printed using inkjet methods.

Unless stated otherwise, pH was measured at 25° C. using an Oakton 510 series pH meter.

The present invention is further illustrated by the following set of numbered paragraphs and combinations resulting from the dependencies and back-references as indicated. In particular, it is noted that in each instance where a range of paragraphs is mentioned, for example in the context of a term such as "The method of any one of paragraphs 1 to 5", every paragraph in this range is meant to be explicitly disclosed for the skilled person, i.e. the wording of this term is to be understood by the skilled person as being synonymous to "The method of any one of paragraphs 1, 2, 3, 4 and 5". Further, it is explicitly noted that the following set of numbered paragraphs represents a suitably structured part of the description directed to general and specific aspects of the present invention.

1. A printing ink composition comprising one or more keratin-based pigment(s) and water, wherein the one or more keratin-based pigment(s) has an average particle size of no more than 3000 nm.
2. The composition according to paragraph 1, wherein the one or more keratin-based pigment(s) has an average particle size of no more than 2000 nm, preferably no more than 1000 nm, more preferably no more than 600 nm.
3. The composition of paragraph 1 or paragraph 2 comprising at least 30% (w/w) water, preferably at least 40% (w/w) water, more preferably at least 50% (w/w) water.
4. The composition of any preceding paragraph comprising from about 30% to about 90% (w/w) water, preferably from about 40% to about 80% (w/w) water, more preferably from about 50% to about 70% (w/w) water.
5. The composition of any preceding paragraph comprising at least 5% (w/w) of one or more keratin-based pigment(s), preferably at least 7% (w/w) of one or more keratin-based pigment(s), more preferably at least 9% (w/w) of one or more keratin-based pigment(s).
6. The composition of any preceding paragraph comprising from about 5% to about 15% (w/w) of one or more keratin-based pigment(s), preferably from about 7% to about 12% (w/w) of one or more keratin-based pigment(s).
7. The composition of any preceding paragraph, further comprising one or more additional materials selected from the group consisting of humectants (solid or liquid), wetting agents, dispersants, surfactants, binders, viscosity modifiers and preservatives.
8. The composition of any preceding paragraph, comprising an acid-functional binder selected from the group consisting of acrylic, polyurethane, styrene-maleic acid, polycarbonate, styrene-maleic anhydride and co-polymers thereof.
9. The composition of any preceding paragraph, wherein the acid-functional binder further comprises hydroxyl groups.
10. The composition of any of paragraphs 1 to 7, wherein the composition comprises no more than 5% (w/w) of a polymeric binder selected from styrene maleic-anhydride, styrene-maleic acid, acrylics, polyurethanes, polycarbonates and co-polymers thereof.
11. The composition of any preceding paragraph, wherein the bio-renewable carbon (BRC) content is ≥90%.
12. The composition of paragraph 8 or paragraph 9, wherein the pigment to binder ratio is in the range of 1:50 to 50:1 pigment particles: binder.
13. The composition of any preceding paragraph, wherein the composition is suitable for deposition using a method selected from inkjet printing, flexographic printing, nozzle coating, slot coating, screen printing, lithography, offset printing and gravure printing, preferably wherein the composition is suitable for deposition using inkjet printing.
14. The composition of any preceding paragraph, wherein the composition is an inkjet ink.
15. The composition of any preceding paragraph, wherein the carrier liquid for the ink is water and a humectant derived from a renewable source.
16. The composition of paragraph 15, wherein the humectant is selected from the group consisting of glycerol, ethylene glycol, diethylene glycol, monopropylene glycol and combinations thereof, preferably wherein the humectant is glycerol.
17. The composition according to any preceding paragraph, comprising a preservative is derived from a renewable source.
18. The composition of paragraph 17, wherein the preservative is selected from the group consisting of 2-phenoxyethanol and sodium benzoate.
19. The composition of any preceding paragraph, comprising a wetting agent or dispersant, preferably wherein the wetting agent or dispersant comprises sodium lauryl sulfate.
20. The composition of any preceding paragraph, comprising a viscosity modifier selected from the group consisting of Guar gum, Gum Arabic, Xanthan gum, trehalose and combinations thereof.
21. A method of de-inking a substrate comprising the ink composition of any one or more of paragraphs 1-20 printed and dried onto the substrate said method comprising immersing the printed substrate in a de-inking solution comprising alkaline water at pH 7.1-14.0, preferably 8.0-12.0, more preferably 10.0-11.0.
22. The method of paragraph 21, wherein the pH of the de-inking solution is maintained by the use of organic amines selected from the group consisting of primary, secondary and tertiary aliphatic amines.
23. The method of paragraph 22 wherein the organic amine is triethanolamine.
24. A method of preparing a printing ink composition according to any of paragraphs 1-20, said method comprising milling a dispersion comprising water and one or more keratin-based pigment(s).
25. A method of printing an image on a substrate, wherein said method comprises applying a printing ink composition according to any of paragraphs 1-20 onto the substrate and curing.
26. The method of paragraph 25 wherein curing is thermal curing, preferably at a temperature of no more than 220° C.
27. The method of paragraph 25 or paragraph 26 wherein said method of printing is selected from inkjet printing, flexographic printing, nozzle coating, slot coating, screen printing, lithography, offset printing and gravure printing, preferably wherein printing is by inkjet printing.
28. The method of any of paragraphs 25-27 wherein the substrate is selected from plastic, textile, paper, metal, glass, polymeric film and ceramic substrates, preferably wherein the substrate is selected from textile and paper.
29. A printed article comprising or derived from the printing ink composition of any of paragraphs 1-20 or prepared by the method of any of paragraphs 25-28.
30. A method of de-inking a substrate comprising:
   i) applying a printing ink composition according to any of paragraphs 1-20 onto the substrate and drying to provide a printed substrate; and
   ii) immersing said printed substrate into a de-inking solution comprising alkaline water at pH 7.1-14.0, preferably 8.0-12.0, more preferably 10.0-11.0.

The present invention has been described in detail, including various embodiments thereof. However, it will be appreciated that those skilled in the art, upon consideration of the present disclosure, may make modifications and/or improvements on this invention that fall within the scope and spirit of the invention.

EXAMPLES

The invention is further described by the following non-limiting examples which further illustrate the invention, and are not intended, nor should they be interpreted to, limit the scope of the invention.

Example 1: A dispersion of the red keratin particles was prepared in solution according to the following process.

TABLE 1

Example 1 Keratin Pigment Dispersion Formulation

| Ingredient | Amount in Formulation | % In Formulation (Excluding Water) | BRC Content | Calculated BRC Content |
|---|---|---|---|---|
| WS Keratin Pigment Red[1] | 23.0 g | 90.5% | 90% | 81.45% |
| Sodium Lauryl Sulfate | 2.0 g | 7.9% | 100% | 7.9% |

TABLE 1-continued

Example 1 Keratin Pigment Dispersion Formulation

| Ingredient | Amount in Formulation | % In Formulation (Excluding Water) | BRC Content | Calculated BRC Content |
|---|---|---|---|---|
| Proxel GXL | 0.27 g | 1.1% | 0% | 0% |
| Airase 5355 | 0.15 g | 0.6% | 0% | 0% |
| TOTAL | 25.42 g | 100% | | 89.35% |
| (Water) | 124.83 g | | Not Included | |

[1]Supplied by Wool Source.

To a glass beaker equipped with a mechanical stirrer was added 124.83 g de-ionised water (conductivity less than 10 microSiemens); followed by 2.0 g Sodium Lauryl Sulphate (dispersant); 0.27 g Proxel GXL (anti-microbial); and 0.15 g Airase 5355 (defoamer). The mixture was stirred whilst 23.0 g of a powder of WS Pigment Red (a keratin pigment having a particle size (Dv50) of 2,032 nm as measured by DLS) was added, with further stirring for 60 minutes to wet out the pigment particles. The resulting pre-mix was then added to an Eiger 50 laboratory mill, fitted with 0.8 mm Ytterbium-Zirconium Oxide grinding media. The mill was started and samples withdrawn periodically to measure the particle size by DLS using a Malvern Zetasizer. After 20 minutes of milling, the Dv50 was 574 nm. After 45 minutes of milling the particle size had increased again to Dv50 1,343 nm and finally after 60 minutes of milling was measured to be 1,543 nm. The dispersion was measured in terms of colour strength compared to the premix. It was found that the colour strength was increased in the dispersion with the smaller particle size. This is a very important result as the colour strength of the final dispersion was found to be significantly higher than the initial colour strength of the pre-mix (prior to milling). The results shown in Table 2 also demonstrate that the colour strength increased with a reduction in the particle size.

Table 2 below shows that the milling time required to reduce the WS Pigment Red particles used in Example 1 down to about 600 nm is only 20 minutes and indeed slightly longer milling times resulted in some increase in particle size. These data demonstrate that a very energy efficient milling process can be used in the present invention to provide pigments having the requisite particle size. The increase in the colour strength after only 20 minutes of milling is also quite remarkable, increasing to over 107% of the original strength. Hence, milling the particles provides keratin-based pigments within increased colour strength.

TABLE 2

Comparison of Colour Strength and particle size for Example 1 Dispersion with Milling Time

| Milling Time | Colour Strength (%) (% STR-SWL) | Dv50 Particle Size (micron) |
|---|---|---|
| 0 mins | 100% | 2.032 |
| 20 mins | 107.21% | 0.574 |
| 45 mins | 106.28% | 1.343 |
| 60 mins | 104.22% | 1.543 |

Further evidence of the increased colour strength of the milled dispersion was obtained by preparing drawdown samples on inkjet coated paper using a No. 6 Kbar. The pre-mix gave a dull shade with some reasonable edge definition. The 45 minutes milled sample showed a very noticeable increase in the colour strength and perfect edge definition. It is hypothesised that the reason for this result is that milling down the pigment particles (preferably to around 600 nm or less although the effect is achieved by milling down to around 1500 nm), results in partial unravelling of the keratin helical structure, which exposes more of the coloured groups on the surface of the keratin.

TABLE 3

Example 2 Keratin Pigment Dispersion Formulation

| Ingredient | Amount in Formulation | % In Formulation (Excluding Water) | BRC Content | Calculated BRC Content |
|---|---|---|---|---|
| WS Keratin Pigment Red[1] | 23.0 g | 89.4% | 90% | 80.46% |
| Sodium Lauryl Sulfate | 2.30 g | 8.9% | 100% | 8.9% |
| Proxel GXL | 0.27 g | 1.1% | 0% | 0% |
| Airase 5355 | 0.15 g | 0.6% | 0% | 0% |
| TOTAL | 25.72 g | 100% | | 89.36% |
| (Water) | 124.83 g | | | |

[1]Supplied by Wool Source.

To a glass beaker equipped with a mechanical stirrer was added 124.83 g de-ionised water (conductivity less than 10 microSiemens); followed by 2.3 g Sodium Lauryl Sulphate (dispersant); 0.27 g Proxel GXL (anti-microbial); and 0.15 g Airase 5355 (defoamer). The mixture was stirred whilst 23.0 g of a powder of WS Pigment Red (a keratin pigment having a particle size (Dv50) of 2,032 nm as measured by DLS) was added, with further stirring for 60 minutes to wet out the pigment particles. The resulting pre-mix was then added to an Eiger 50 laboratory mill, fitted with 0.8 mm Ytterbium-Zirconium Oxide grinding media. The mill was started and samples withdrawn periodically to measure the particle size by DLS using a Malvern Zetasizer. After 30 minutes of milling, the Dv50 was 593 nm. The dispersion was measured in terms of colour strength compared to the premix. It was found that the colour strength was increased in the dispersion with the smaller particle size. This is a very important result as the colour strength of the final dispersion was found to be significantly higher than the initial colour strength of the pre-mix (prior to milling). The results shown in Table 4 also demonstrate that the colour strength increased with a reduction in the particle size. The viscosity of the dispersion was measured using a Brookfield DVII+ Pro, fitted with a 00 spindle, and found to 5.13 cP at 32° C.

TABLE 4

Comparison of Colour Strength and particle size with Milling Time

| Milling Time | Colour Strength (%) (% STR-SWL) | Dv50 Particle Size (micron) |
|---|---|---|
| 0 mins | 100% | 2.032 |
| 30 mins | 105.17% | 0.593 |

This second example with an optimised milling time for particle size liberated particles with a Dv50 particle size of 593 nm, again demonstrating s significant increase in colour strength of the dispersion after milling.

TABLE 5

Example 3 Finished Ink Formulation

| Ingredient | Amount in Formulation | % In Formulation (Excluding Water) | BRC Content | Calculated BRC Content |
|---|---|---|---|---|
| Example 2 Dispersion (RR4415-45) | 25.0 g | 71.4% | 89.36% | 63.80% |
| Glycerine | 10.0 g | 28.6% | 100% | 28.60% |
| TOTAL | 35.0 g | 100% | | 92.40% |

Preparation of a simple ink for subsequent evaluation by inkjet printing was performed using the following process. To 25 g of a separate sample of the Example 2 dispersion was added 10 g of glycerine. The particle size of the input material was measured at 593 nm by DLS. The mixture was stirred using a magnetic stirrer in a glass beaker for about 60 minutes and then the physical properties of the ink were measured.

The viscosity of the ink was measured using a Brookfield DVII+Pro, fitted with a 00 spindle, and found to 6.57 cP at 32° C. and 6.08 cP at 35° C.

The resulting Example 3 ink was then loaded into a Dimatix DMP print cartridge and the printer set so the print head temperature was 32° C. and the print head angle was 2.5°. The print resolution was set to 1,700 DPI. A 2 cm×2 cm print block was achieved in a single pass. The printed image on Panama cotton showed a very well resolved edge, with a good, uniform colour saturation across the block of printed colour and good wetting of the cotton weave. Furthermore, the edges and the corners for the square block were very well resolved indicating that the print quality was good.

The resulting prints were then heat cured at 160° C. for two minutes using a standard thermal heat press.

Films of the ink from Example 3 were also produced by drawdown, using a 24-micron ink film which was applied to PET and then transfer printed onto Panama cotton and dried for five minutes at 150° C. The ink coverage of such drawdown generated samples replicates closely the same ink laydown expected from inkjet printing.

Washfastness of the drawdown printed Panama cotton was tested as follows. Under very aggressive test conditions, using a 1% solution of standard washing detergent (Persil, Unilever), the pigment was partially removed from Panama cotton, and was awarded a washfastness rating of 2-3, where 4 is completely fixed and 1 is completely removed. This is an average rating for a textile pigment ink. It should be noted that this inventive example did not contain any additional optional binder.

The Resolubility of the inks was measured using the standard method of casting a film of the ink on a glass slide, allowing the ink to air dry for at least one hour, and then immersing the ink in either deionised water or a 1% solution of Tergitol 15-S-7 in deionised water. In both cases, the resolubility was awarded 4 by visual inspection, in that the dried ink was removed from the glass slides as small flakes which were still present as flakes in the washing solution after 60 minutes. In this context, perfect resolubility is 4 and no Resolubility is 1. The Resolubility test is developed to mimic what would happen in an inkjet printing head if the ink is permitted to dry out in the air, and then could be permanently damaged if the ink which has dried is not resoluble. A Resolubility rating of 4 indicates a very good fit for industrial textile printing.

The de-inking was tested by submerging the fabrics (in this case Panama cotton) into a basic solution for 2 hours at 60° C. Three basic solutions were examined with pH 10-13. In all cases, facile de-inking was observed. In particular, when using pH 10, 11.5 and 13.0, the de-inking after 2 hours was awarded a 4 rating. The de-inking is rated as 4 being completely removed and leaving a pristine white surface (as though the ink had been bleached from the surface) and 1 being absolutely no removal of the ink.

TABLE 6

Resistance Properties

| Ink | Wet Rub Fastness[2] | Dry Rub Fastness | Resolubility | De-inkability |
|---|---|---|---|---|
| Example 3 Keratin-based pigment ink | 2-3 | 2-3 | 4 | 4 |
| Comparative Ink[1] | 2-3 | 4-5 | 2-3 | 1 |

[1]538PIKY1 Xennia Emerald Red (Sun Chemical) based on standard organic pigment that has been optimized for inkjet printing. The comparative ink is also water-based and comprises glycol co-solvents.
[2]The test methods for wet and dry rub fastness are taken from physical rub tests (ISO 105 X12 and ASTM D 5264).

As demonstrated by the results in Table 6, the inks of the present invention provide improved resolubility and de-inkability compared with the comparative ink.

The invention claimed is:

1. A printing ink composition comprising one or more keratin-based pigment(s) and water, wherein the one or more keratin-based pigment(s) has an average particle size of no more than 3000 nm, wherein average particle size is Dv50 measured by dynamic light scattering wherein the keratin-based pigment(s) are milled.

2. The composition according to claim 1, wherein the one or more keratin-based pigment(s) has an average particle size of no more than 2000 nm, preferably no more than 1000 nm, more preferably no more than 600 nm.

3. The composition of claim 1 comprising from about 30% to about 90% (w/w) water, preferably from about 40% to about 80% (w/w) water, more preferably from about 50% to about 70% (w/w) water.

4. The composition of claim 1 comprising from about 5% to about 15% (w/w) of one or more keratin-based pigment (s), preferably from about 7% to about 12% (w/w) of one or more keratin-based pigment(s).

5. The composition of claim 1, comprising an acid-functional binder selected from the group consisting of acrylic, polyurethane, styrene-maleic acid, polycarbonate, styrene-maleic anhydride and co-polymers thereof.

6. The composition of claim 1, wherein the acid-functional binder further comprises hydroxyl groups.

7. The composition of claim 1, wherein the composition comprises no more than 5% (w/w) of a polymeric binder selected from styrene maleic-anhydride, styrene-maleic acid, acrylics, polyurethanes, polycarbonates and co-polymers thereof.

8. The composition of claim 1, wherein the composition is an inkjet ink.

9. The composition of claim 1, wherein the carrier liquid for the ink is water and a humectant derived from a renewable source.

10. The composition of claim 9, wherein the humectant is selected from the group consisting of glycerol, ethylene glycol, diethylene glycol, monopropylene glycol and combinations thereof, preferably wherein the humectant is glycerol.

11. The composition according to claim 1, comprising a preservative is derived from a renewable source.

12. The composition of claim 11, wherein the preservative is selected from the group consisting of 2-phenoxyethanol and sodium benzoate.

13. The composition of claim 1, comprising a wetting agent or dispersant, preferably wherein the wetting agent or dispersant comprises sodium lauryl sulfate.

14. A method of de-inking a substrate comprising the ink composition of claim 1 printed and dried onto the substrate said method comprising immersing the printed substrate in a de-inking solution comprising alkaline water at pH 7.1-14.0, preferably 8.0-12.0, more preferably 10.0-11.0.

15. The method of claim 14, wherein the pH of the de-inking solution is maintained by the use of organic amines selected from the group consisting of primary, secondary and tertiary aliphatic amines.

16. A method of preparing a printing ink composition comprising one or more keratin-based pigment(s) and water, wherein the one or more keratin-based pigment(s) has an average particle size of no more than 3000 nm, said method comprising milling a dispersion comprising water and one or more keratin-based pigment(s), wherein average particle size is Dv50 measured by dynamic light scattering.

17. The method of claim 16, wherein milling is performed for up to 60 minutes, preferably for up to 45 minutes.

18. A method of printing an image on a substrate, wherein said method comprises applying a printing ink composition according to claim 1 onto the substrate and curing.

19. The method of claim 18 wherein the printing ink composition is milled prior to application onto the substrate.

20. The method of claim 18 wherein curing is thermal curing, preferably at a temperature of no more than 220° C.

21. The method of claim 18 wherein the substrate is selected from plastic, textile, paper, metal, glass, polymeric film and ceramic substrates, preferably wherein the substrate is selected from textile and paper.

22. A method of de-inking a substrate comprising:
  i) applying a printing ink composition according to claim 1 onto the substrate and drying to provide a printed substrate; and
  ii) immersing said printed substrate into a de-inking solution comprising alkaline water at pH 7.1-14.0, preferably 8.0-12.0, more preferably 10.0-11.0.

23. The method of claim 22 wherein the printing ink composition is milled prior to application onto the substrate.

* * * * *